United States Patent Office 3,102,733
Patented Sept. 3, 1963

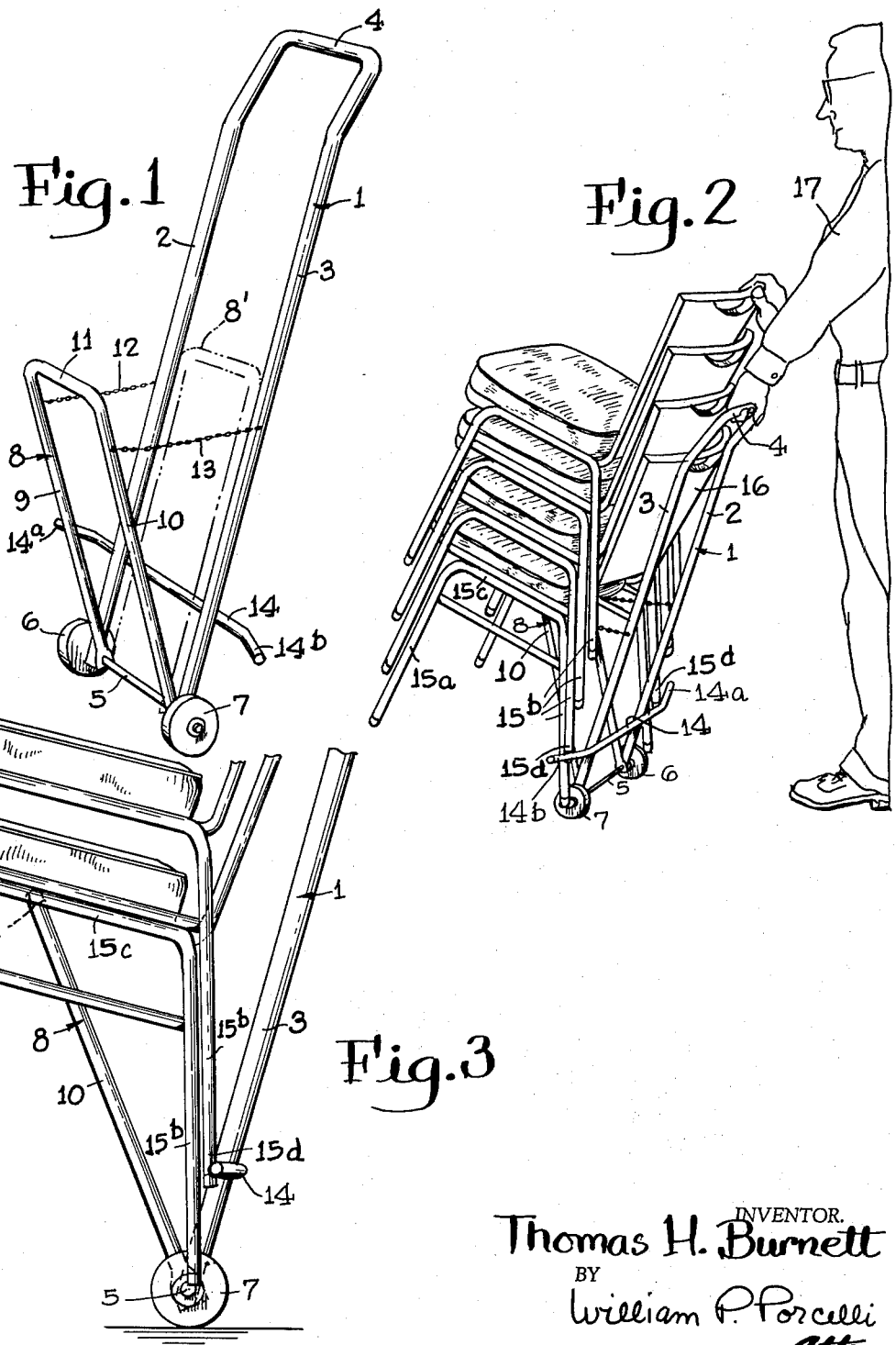

3,102,733
HAND TRUCK
Thomas H. Burnett, Elgin, Ill., assignor to Acme Steel Company, Chicago, Ill., a corporation of Illinois
Filed Feb. 2, 1962, Ser. No. 170,662
4 Claims. (Cl. 280—36)

This invention relates to the art of wheeled hand trucks and particularly to one adapted for transporting stacks of chairs, or the like.

Presently, there is a trend toward designing tubular metal dinette and kitchen type chairs with divergent legs which permit the chairs to be nested and stacked one above the other for the principal purpose of conserving space when the chairs are stored or shipped. With the chairs nested and stacked, it is common to manually lift and carry the nested stacks from one place to another as required. It is, however, desirable to have some type of wheeled means for transporting these stacks without the need for manually lifting and carrying them. It is, therefore, the principal object of this invention to provide a wheeled hand truck of relatively simple construction which can be used conveniently and efficiently to transport such nested stacks of chairs. It is still another object of the invention to provide such a wheeled hand truck which is inexpensive to manufacture, lightweight, durable and which can be folded or collapsed when not in use. It is another object of the invention to provide such a wheeled hand truck having chair engaging portions which support the chairs in a manner whereby forward force can be applied to the stack of chairs on the truck without causing the chairs to be pushed off of the hand truck and this feature facilitates manipulation of the hand truck when it is provided with a chair stack.

Other objects and advantages of the invention can be better understood by referring to the accompanying drawings, in which FIG. 1 shows a perspective view of an unloaded hand truck made according to the invention;

FIG. 2 shows a perspective view of a hand truck loaded with a stack of nested chairs being manipulated by a worker; and FIG. 3 shows a fragmentary view of the lower portion of the hand truck shown in FIGS. 1 and 2, but with only two chairs stacked on it.

The preferred embodiment of the invention shown in FIG. 1 consists of a larger inverted U-shaped frame 1 made from a bent piece of tube and provided with two downwardly extending arms 2 and 3 connected on either side of a horizontal arm 4 which is intended as the handle to be manipulated by a worker. The lower ends of the arms 2 and 3 are pivoted on a shaft 5 which is provided with two freely rotatable wheels 6 and 7 at its outer ends. Also pivoted between the arms 2 and 3 on this same shaft 5 is another inverted U-shaped frame 8 having two downwardly extending arms 9 and 10 connected on either side of a horizontal arm 11. The lower ends of the arms 9 and 10 which are pivoted to the shaft 5 between the arms 2 and 3 of the frame 1 permit the frame 8 to be pivoted between the position shown in solid lines and the position shown at 8' in phantom lines in FIG. 1. When the frame 8 is in the position as shown in solid lines, it is ready for use for carrying a stack of chairs. When it is pivoted to the position 8', it is folded away so that the entire truck can be stored conveniently. Chains 12 and 13 are connected between the two members 1 and 8 in order to limit the position of the frame 8 in a direction away from the frame 1.

A short distance up from the shaft 5 a bar 14 is secured crosswise of the two arms 2 and 3 of the frame 1. It is provided to limit the travel of the frame 8 in its storage position so that the frame 8 can be nested parallel to the frame 1. The outer end portions 14a and 14b of this bar 14 are provided as stops to maintain a fixed position of one of the chairs in a stack of chairs carried by the hand truck. This bar 14, when used as a stop, prevents forward rotation of the stack of chairs on the truck so that a certain forward force can be applied by the worker against the chairs in order to manipulate and move the hand truck forward.

In FIG. 2, there are four stacked chairs of a somewhat conventional type shown being carried on a hand truck of identical construction to that of FIG. 1. Each side of a chair is provided with two legs 15a and 15b which extend down from a connecting bar 15c, the legs and connecting bar being bent from a single continuous piece of tubing. These legs 15a and 15b are divergent away from the bar 15c so that a chair of the same construction can be stacked upon it with the divergent legs of a chair upon another nesting closely and parallel to the legs of the chair below. Because of the particular positioning of the bar 14 as shown, the extreme ends of the two legs 15b of the chair stacked second from the bottom reacts against the end portions 14a and 14b of the bar 14 while the seat portion of the bottom chair rests on top of the connecting arm 11 of the frame 8 (see FIG. 3). The backrest 16 of the lowermost chair rests against the arms 2 and 3 of the frame 1. With this arrangement, the chairs are primarily supported on the connecting arm 11 of the frame 8, but prevented from rotating backwardly by the positioning of the backrest 16 of the lowermost chair against the frame 1. Also, the chairs are prevented from rotating forwardly because the lower ends 15d of the legs 15b of the second chair from the bottom react against the end portions 14a and 14b of the bar 14. With this arrangement, a worker 17 finds it convenient to transport a stack of chairs by means of the wheeled hand truck without fear of the stack toppling because the structure of the hand truck provides positioning of the stack of chairs in a stable manner as described.

Although only a single embodiment of the invention has been shown, it should be clearly understood that the invention can be made in many different ways without departing from the true scope of the invention as defined by the appended claims.

I claim:

1. A hand truck comprising, a first frame and a second frame pivoted together at their lower end regions to permit relative angular movement of the frames between a first position with the two frames co-planar for storage purposes and a second position with the upper portions of the frames angularly separated from each other, the upper portion of the first frame in said second position being positioned to support the bottom of a stack of nested chairs, and the upper portion of the second frame in said second position adapted to support the back of at least one chair in the stack and thereby prevent said one chair from rotating in one direction, said second frame being provided with a stop positioned to limit the relative angularity of the frames in their first position with the frame co-planar and to react against at least one leg of a chair in the stack and restrain the chair from rotation in a second direction, and a flexible connector mounted between the two frames to limit their angularity in their second position, said frames being provided with support wheels rotatably mounted thereon.

2. A hand truck defined by claim 1 characterized by, said second frame extending further than the first frame from the region where the two frames are pivoted together so that when the truck is in an upright position the upper portion of the first frame is lower than the upper end of the second frame so that the first frame conveniently accommodates the lower level of the bottom of a chair while the second frame accommodates the higher level of the back of a chair.

3. A hand truck comprising, a first frame and a second frame pivoted together at their lower end regions to permit relative angular movement of the frames between a first position where the two frames are co-planar with each other and a second position where the upper portions of the frames are angularly separated from each other, the upper portion of the first frame in said second position being positioned to support the bottom of a stack of nested chairs, and the upper portion of the second frame in said second position being adapted to support the back of at least one chair in the stack and thereby prevent rotation of said one chair in one direction, said second frame being provided with a stop position to limit the relative angular movement when the two frames are moved to their first position with the frames co-planar and to react against at least one leg of a chair in the stack and restrain the chair from rotation in a single direction.

4. A hand truck comprising, a first frame and a second frame pivoted together at their lower end regions to permit relative angular movement of the frames between a first position where the two frames are co-planar with each other and a second position where the upper portions of the frames are angularly separated from each other, the upper portion of the first frame in said second position being positioned to support the bottom of a stack of nested chairs, and the upper portion of the second frame in said second position being adapted to support the back of at least one chair in the stack and thereby prevent rotation of said one chair in one direction, said second frame being provided with a stop positioned to limit the relative angular movement when the two frames are moved to their first position with the frame co-planar and to react against at least one leg of a chair in the stack and restrain the chair from rotation in a second direction, and a flexible connector mounted between the two frames to limit the angularity between the frames when they are moved to their second position.

References Cited in the file of this patent
FOREIGN PATENTS
108,256 Sweden _____ Aug. 17, 1943